(12) United States Patent
Holzmann

(10) Patent No.: US 8,601,100 B2
(45) Date of Patent: Dec. 3, 2013

(54) SYSTEM AND METHOD FOR BOOTING MULTIPLE SERVERS FROM A SINGLE OPERATING SYSTEM IMAGE

(75) Inventor: Richard Holzmann, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 1569 days.

(21) Appl. No.: 10/873,665

(22) Filed: Jun. 22, 2004

(65) Prior Publication Data

US 2005/0283597 A1    Dec. 22, 2005

(51) Int. Cl.
*G06F 15/173* (2006.01)
*G06F 9/00* (2006.01)
*G06F 11/00* (2006.01)

(52) U.S. Cl.
USPC .............. 709/223; 709/224; 726/14; 726/22; 714/39

(58) Field of Classification Search
USPC ........................................................ 709/222
See application file for complete search history.

(56) References Cited

U.S. PATENT DOCUMENTS

| | | | |
|---|---|---|---|
| 5,889,996 A * | 3/1999 | Adams ......................... | 717/139 |
| 5,960,175 A * | 9/1999 | Grossman et al. ............ | 709/222 |
| 6,463,530 B1 * | 10/2002 | Sposato ........................... | 713/2 |
| 6,654,797 B1 * | 11/2003 | Kamper ........................ | 709/220 |
| 6,959,331 B1 * | 10/2005 | Traversat et al. ............. | 709/222 |
| 6,965,989 B1 * | 11/2005 | Strange et al. ................... | 713/1 |
| 2002/0029283 A1 * | 3/2002 | Beckett et al. ................ | 709/231 |
| 2005/0091349 A1 * | 4/2005 | Scheibli ....................... | 709/222 |
| 2005/0138628 A1 * | 6/2005 | Bradford et al. .............. | 718/107 |

* cited by examiner

*Primary Examiner* — Ranodhi Serrao
(74) *Attorney, Agent, or Firm* — Locke Lord LLP

(57) ABSTRACT

The invention is directed to a system and method for booting multiple servers or other network resources from a single operating system image. The operating system image is stored on a solid state disk. When a server is booted, cache space is allocated in the volatile memory portion of the solid state disk. This cache is used to store data necessary for booting and operation of the operating system. As additional servers or other network resources are booted, the cache is used to access the necessary operating system data.

8 Claims, 5 Drawing Sheets

SYSTEM AND METHOD FOR BOOTING MULTIPLE SERVERS FROM A SINGLE OPERATING SYSTEM IMAGE

BACKGROUND OF THE INVENTION

1. Field of the Invention

The invention is directed generally to computer storage systems. More specifically, the invention is directed to a system and method for booting multiple servers using a single operating system image located on a solid state disk in a storage area network.

2. Description of Related Art

The use of solid state disk (SSD) systems allows organizations to obtain increased returns from their IT hardware investments. SSD systems allow centralized storage and retrieval of data and have many advantages over individual workstations or servers that use conventional storage systems, such as conventional rotating disks or tape drives. SSD systems can access data more quickly and process more read and write requests than conventional disk systems found on most server computers.

Furthermore, SSD systems are more reliable than disks and other comparable storage systems. This reduces downtime, resulting in performance benefits and cost savings. Moreover, SSD systems are well suited for use in a storage area network (SAN) based upon the SSD's performance capacities. This allows for consolidated management of data storage and can create a virtual, dynamic resource that can be used for specific tasks by separate business units, as needed. As a result, many businesses and other organizations and enterprises are incorporating SSD systems into their IT configurations.

Solid state disk systems typically comprise a temporary memory module, such as a random access memory (RAM); a battery supported power system; and a non-volatile (rotating disk) storage means. In the event of a power outage or other shutdown, data is automatically copied from the memory module to the storage means. When power is restored, the data is re-written from the storage means to the memory module upon start-up. Solid state disk systems may also comprise control devices that allow users to manually backup data from the memory module to the storage means. Solid state disk systems may also comprise communication controllers, such as Fibre Channel (FC) controllers or SCSI mechanisms, for managing data communication with external computing devices.

Solid state disk systems can also be used, when connected to a computer network, to store operating system images for a server, several servers, or a network of servers. When server boot-up is initiated, the server accesses the SSD, requesting the appropriate operating system image. The image is then used by the server for boot.

Booting servers from a SAN offers numerous advantages. The SAN allows the various operating system images to be stored centrally, allowing for efficient loading, monitoring, patching and updating of the operating system. Central storage of operating system images on the SAN also facilitates easier replacement or swapping of server hardware.

Despite these and other advantages, one limitation of booting server hardware through a SAN is that, currently, a separate operating system image must be stored for each server in the network. Each server must have access to its own assigned operating system image to avoid data corruption, information loss, operating system crashes and other problems. However, use of a separate operating system image for each server is wasteful and expensive, requiring greater use of memory and other system resources.

As a result, there is a great need in the art for a system and method for booting multiple servers from a storage area network using a single operating system image stored on the network.

SUMMARY OF THE INVENTION

These and other advantages of the present invention will be readily apparent to those skilled in the art from the detailed description below.

DETAILED DESCRIPTION

Figure 1:
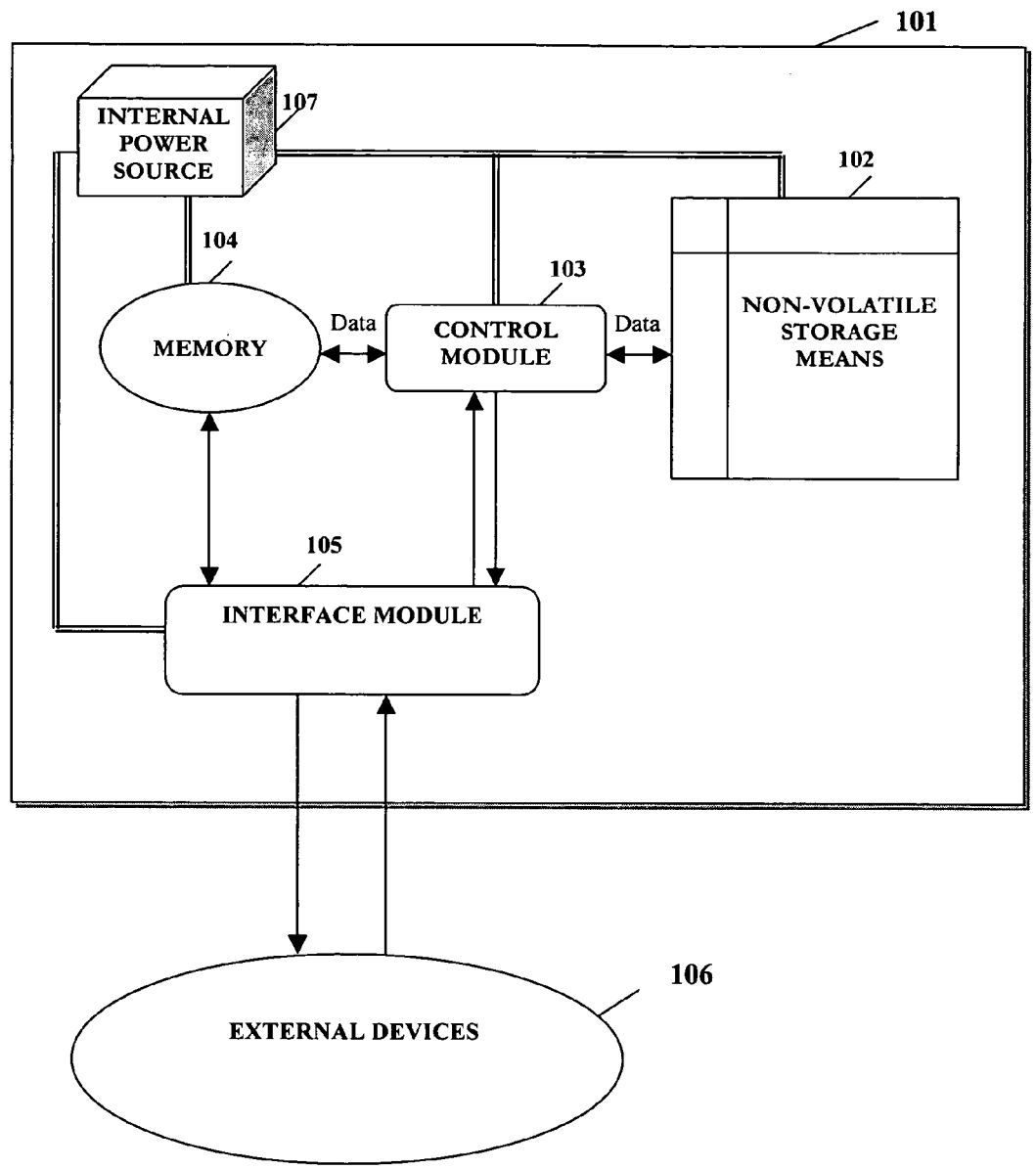
FIG. 1 is a functional diagram illustrating a system for storing data, including operating system images disposed on a memory module in a solid state disk system

Referring now to the figures, the present invention is directed to a system and method for booting multiple servers or other external devices from a storage area network using a single OS image. FIG. 1 is a block diagram illustrating the component parts of the invented system and the functions of each component part. The invented system comprises a solid state disk system 101 having a storage means 102, a control module 103, a memory module 104, an interface module 105 that communicates with external devices 106, and an internal power source 107.

The storage means 102 comprises a means for electronic storage of data that does not need to be periodically refreshed. The storage means 102 may comprise, for example, a hard disk system. The storage means may alternatively comprise another non-volatile storage means, such as a semiconductor memory array or flash memory array.

The control module 103 facilitates the copying of data to the storage means 102 from the memory module 104, and the writing of data from the storage means 102 to the memory module 104. In the present invention, the control module 103 automatically manipulates the copying and writing of data between the memory module 104 and the storage means 102. The control module 103 preferably also allows for manual manipulation of the copying and re-writing of data.

The memory module 104 comprises at least one direct-access memory module for holding data currently or recently used by external devices 106. The memory module 104 is more quickly accessible, and performs read and write processing functions more quickly, than non-volatile or disk memory, such as storage means 102. The memory module 104 preferably comprises at least one random-access memory (RAM) module. The RAM module may comprise dynamic random-access memory (DRAM), synchronous DRAM (SDRAM), double data rate (DDR) memory, or other appropriate memory technology.

According to the present invention, and as described further below with reference to FIG. 4, the memory module 104 may contain an image of an operating system. Alternatively, the memory module 104 may contain only those parts of the operating system image required for server operation. The memory module 104 may further contain the swap space for the operating system, as well as application data stored by the OS and other OS data. Under the present invention, and as described further below with reference to FIG. 4, the control module 103, monitors boot requests from external devices 106. Upon receiving a boot request, the control module 103 loads the required portion of the operating system image (the portion loaded typically depends on the operating system and its boot process) into memory module 104, if the image has not been loaded freely. The control module 103 then allocates a sub-portion of the memory portion to be used as a cache for the operating system. As multiple servers or other external devices 106 are booted, the control module 103 allocates additional space into the cache stored in memory module 104. Portions of the cache may be assigned statically for each server or other external devices 106. Alternatively, and preferably, the portions of the cache attributed to each server may be assigned dynamically, as described further below with reference to FIG. 5.

The interface module 105 manages communication between the system 101 and external devices 106. The interface module 105 receives and processes read and write commands from external devices 106. Based upon commands it receives from external devices 106, the interface module 105 issues commands to the control module 103 and to the memory module 104, as the case may warrant. The interface module 105 then receives data and commands from the control module 103 and the memory module 104, and returns requested data or otherwise responds to the external devices 106.

With respect to the current invention, the interface module 105 receives data requests (read commands) from external devices 106 for particular data blocks. The interface module 105 translates these blocks into segments, retrieves the data segments from memory 104, and returns the requested data blocks to the external devices 106. The interface module 105 also receives write commands from external devices 106 to update data disposed on the memory module 104. The interface module sends corresponding write data to the memory module 104 for updating the data.

With respect to the present invention, at least one of the external devices 106 requires booting from an operating system. The external device 106 requests operating system data through the interface module 105. As described further below, the control module 103 monitors the request for operating system data, and determines whether the particular operating system data block requested by the external devices 106 has previously been loaded into the operating system cache. If the data block has been loaded into the cache, and that data block has not been overwritten subsequent to being loaded into the cache, the requested data block is provided from the cache in memory module 104 to interface module 105 for transmission to the appropriate external device 106.

The interface module 105 may communicate with external devices 106 via Ethernet or FC or other appropriate interface. Preferably, the interface module 105 communicates with external devices 106 via FC. The interface module 105 may comprise an application-specific integrated circuit (ASIC), such as QLogic Fiber Channel ASIC. Alternatively, the interface module 105 may comprise a general integrated circuit, such that it may process requests from multiple applications and process different request protocols.

External devices 106 comprise computing devices, such as servers having central processing units that are capable of submitting commands and data requests to, and receiving requested data and responses from, the interface module 105, via FC communication, Ethernet, or other appropriate communication means.

The internal power supply 107 comprises a temporary power supply suitable for providing adequate power to facilitate the copying of data from the memory module 104 to the storage means 102 in the event that external power to the system 101 should fail. The internal power supply 107 may comprise, for example, at least one battery, extended-life battery pack or direct current uninterrupted power supply (DC UPS). Upon shutdown or failure of external power to the system 101, the internal power supply 107 provides sufficient power for data residing in memory module 104 to be copied to the storage means 102, upon prompting by the control module 103. When power is restored and start-up of the system 101 is initiated, all or a portion of the data may be re-written from the storage means 102 to the memory module 104.

Figure 2:
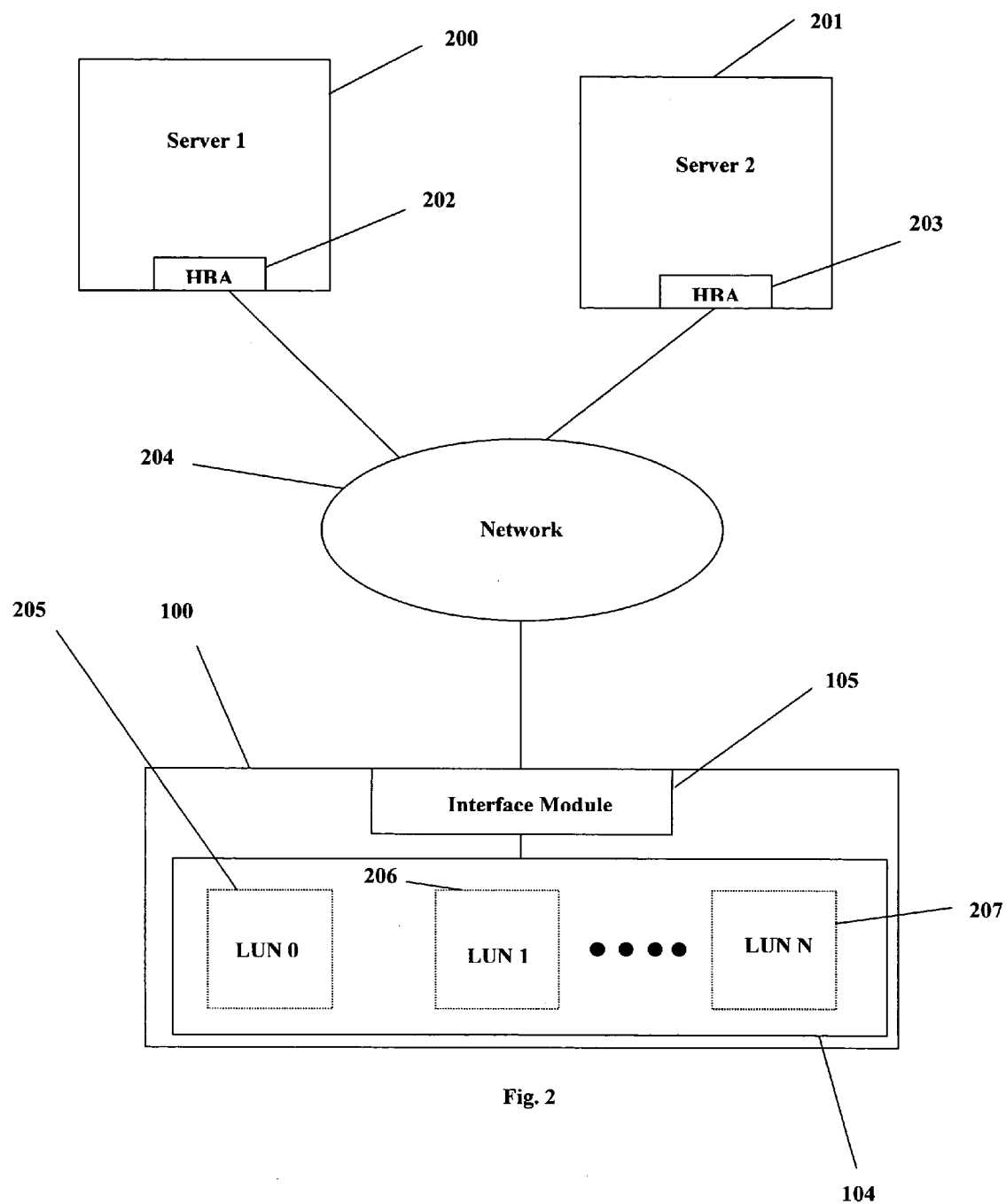
FIG. 2 is a block diagram of a possible configuration of a solid state disk system in a computer network.

FIG. 2 is a block diagram illustrating a possible configuration of a solid state disk system in a computer network. In this configuration, Servers 200 and 201 are connected to a storage network 204, and each communicate with the network 204 through a Host Bus Adapter (HBA) 202 and 203 respectively. HBA 202 and 203 may comprise Ethernet, FC or other appropriate Adapter. The network 204 preferably comprises a storage area network (SAN).

As depicted in FIG. 2, the solid state disk system is connected to the network 204 and communicates with the network, including servers 200 and 201 through the interface module 105. In this example configuration, the memory portion 104 is segmented into Logical Unit Numbers (LUNs) 0 205, LUN 1 206 through LUN N 207. Segmenting the memory portion into LUNs allows simpler and more efficient addressing and data retrieval for each of the servers 200 and 201. For example, one LUN may be assigned to each server. Other LUN assignments are possible, such as multiple LUNs per server, or use of a single LUN.

Figure 3:
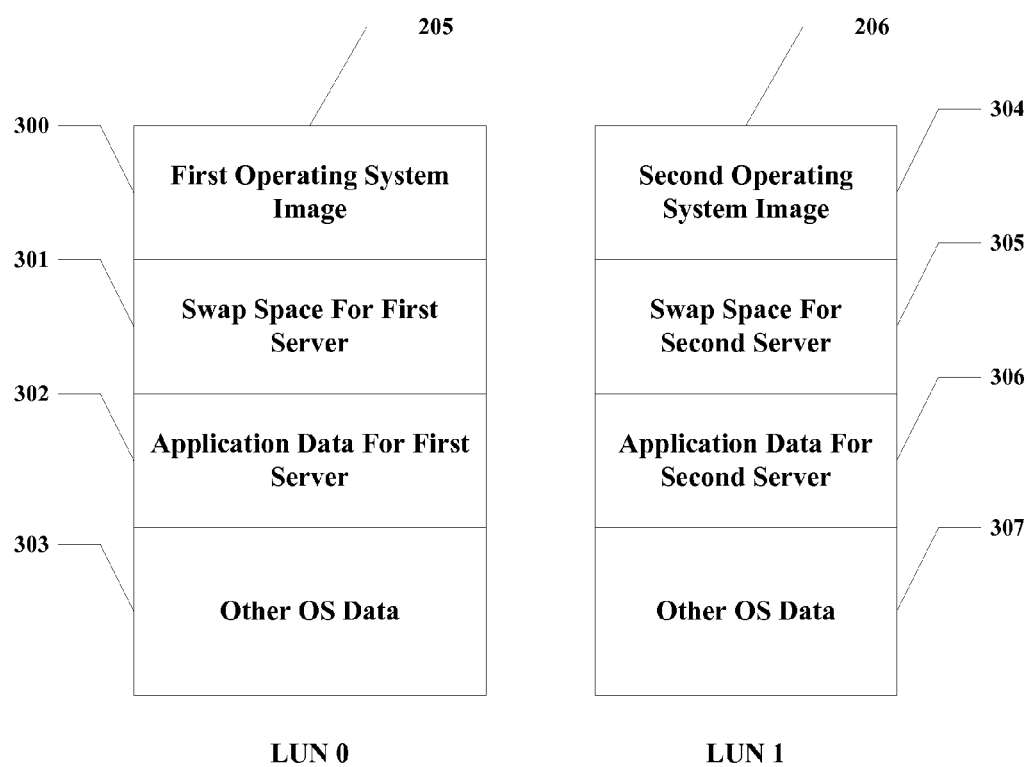
FIG. 3 is a diagram of the allocation of memory in a typical remote boot configuration.

FIG. 3 shows allocation of memory in each LUN 205 and 206 in a typical, prior art remote boot configuration. In the event of a remote boot for server 200, an operating system image 300 is loaded into LUN 0 205. The operating system image 300 can be an image of Microsoft Windows®, UNIX, LINUX or other appropriate operating system. The operating system 300 can then allocate swap space 301 in LUN 0 205. This swap space is used in the event that server 200 has insufficient on-board RAM or other memory to properly perform all operating system and application functions. The operating system 300 may further allocate space in which to store application data 302. This application data 302 may contain lists of active or resident applications, application settings, and other appropriate data. Operating system image 300 may further allocate space for other OS data, such as lists of hardware devices or other appropriate information. The remaining memory space in LUN 0 205 is allocated to be used by server 200 as necessary for running applications, storage files, and other appropriate uses.

In the event that a second server is booted from the prior art solid state disk configuration shown in FIG. 3, a second operating system image 304 is loaded into LUN 1 206. This second operating system image 304 then assigns swap space 305, application data 306 and other OS data 307 for the second server. The data for each operating system may vary according to the operating system being accessed for a particular server. Accordingly, for the prior art configuration depicted in FIG. 3, a separate copy of the operating system data is loaded for each server which is booted remotely from the storage area network.

Figure 4:
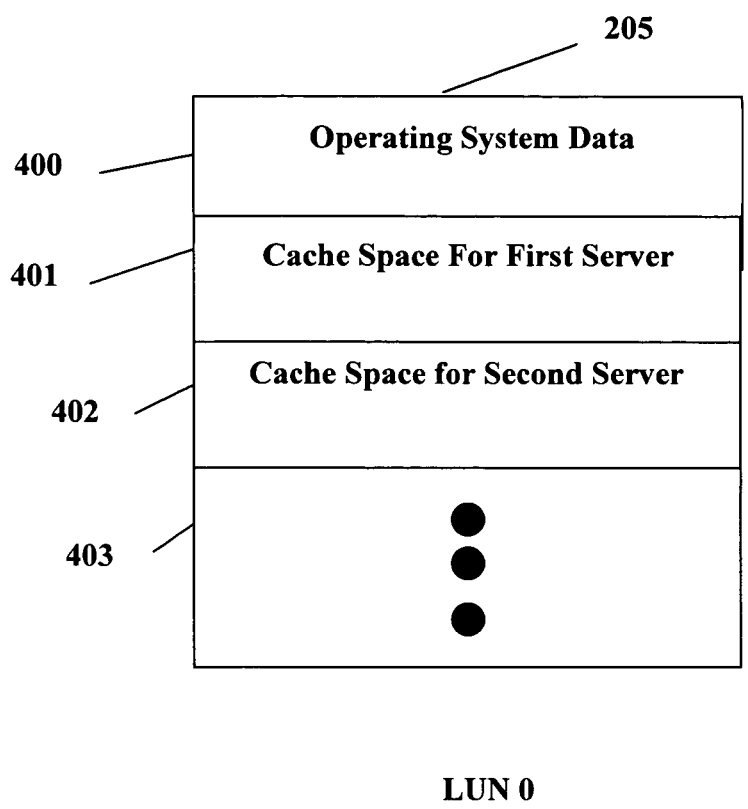
FIG. 4 depicts a possible configuration of the memory portion depicted in FIG. 1 under the invented system and method.

FIG. 4 depicts a possible configuration of the memory portion 205 under the inventive system and method. In this arrangement, a single copy of the appropriate operating system data 400 is loaded into the memory portion 205. The actual operating system data 400 loaded into the memory portion 205 will vary according to the operating system being used. When a server or other device in the computer network makes a boot request through the network to control module 103, the operating system data 400 is used to boot the server. The control module 103 then segments a sub-portion of the memory 104 into a first cache 401. This first cache 401 is used for further OS operations during the boot process and during operation of the server or other external device.

If a second server or other external device sends a boot request to control module 103, the module allocates additional space in the cache for a second cache 402. Alternatively, upon startup of the solid state disk system, the control module 103 may determine the number of resources on the computer network likely to be booted during network operation, by polling the network, consulting a stored table of network resources, or other appropriate operation. The control module 103 may then allocate space in the memory portion 205 to provide a cache for operation of the operating system for each network resource. If additional servers require boot operations, additional cache space 403 can by allocated for those servers. By allocating separate cache space for each server or other network resource, the inventive system prevents corruption of data, overwriting of data, and other harmful actions that would lead to resource malfunction.

Figure 5:
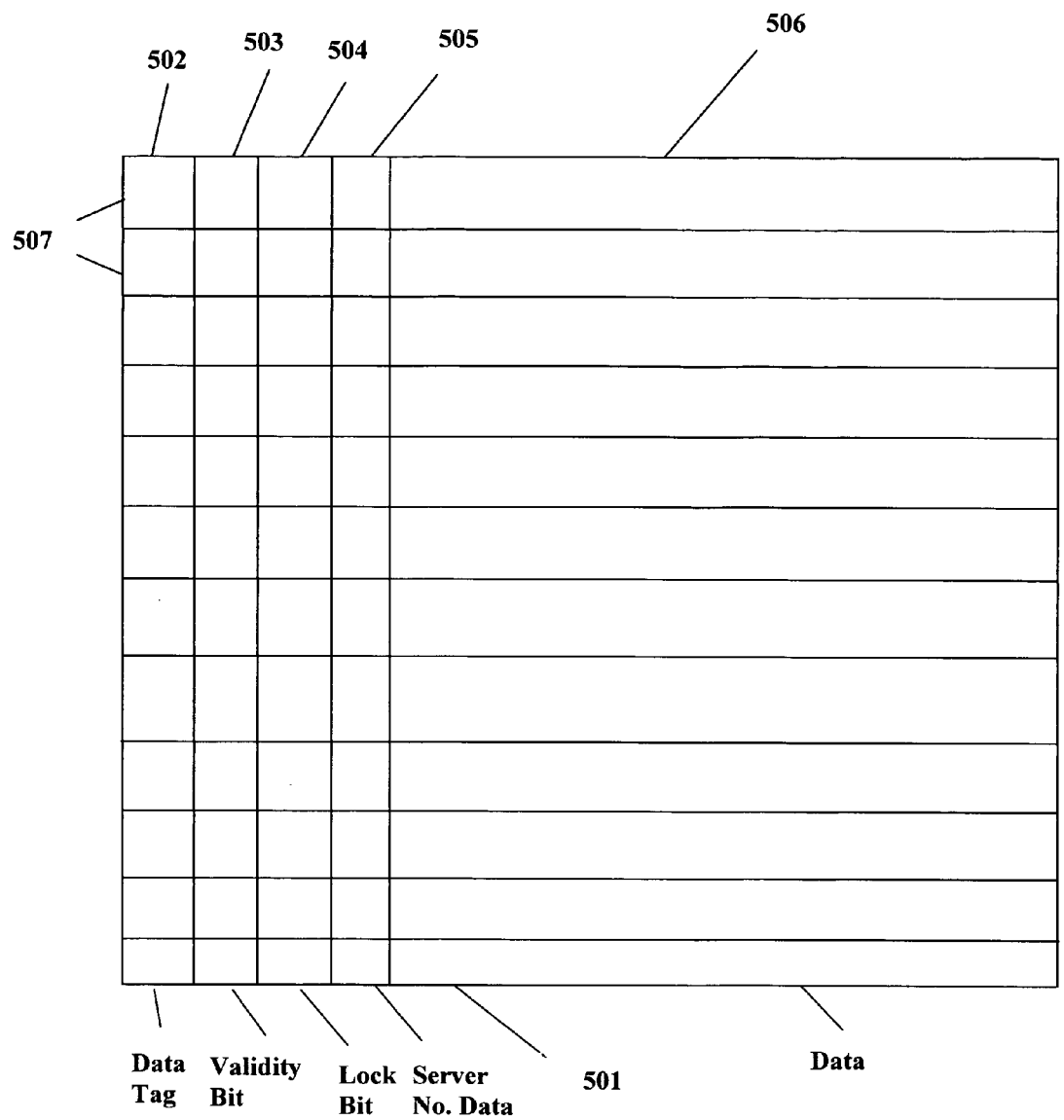
FIG. 5 is a diagram showing a possible dynamic configuration of cache resources under the inventive system and method.

Alternatively, the present system may be configured to allow for dynamic allocation of cache resources through the use of a non-associative cache, as depicted in FIG. 5. FIG. 5 depicts a non-associative cache 501. In accordance with the present invention, the non-associative cache 501 is a reserved segment of the memory portion 400. The memory in the non-associative cache 501 is divided into several lines 507. Each line 507 corresponds to a particular memory segment of the operating system data stored in memory portion 205. Each line 507 is further divided to store different types of information. In particular, each line 507 contains space to store the data tag 502, a validity bit 503, a locked bit 504, server number data 505, and data 506. When a read request for operating system data is transmitted from a server, the control module 103 checks the non-associative cache 501 to determine if the data has already been loaded into the cache. The control module 103 does this by reviewing the validity bit 503. The control module also determines if the data stored in the cache has been changed subsequent to being copied into the cache 501 by checking the locked bit 504.

If the requested data has not been loaded into the cache 501, the control module 103 copies the data from the operating system data stored in memory portion 400 to the cache 501. In particular, the data is copied to the cache line 507 that corresponds to the appropriate memory segment of the operating system data. For example, the operating system data may be stored in memory address location 0 through 999. The cache 501 may consist of 100 separate lines 507. If a request is made for the operating system data stored in location 235, the data is preferably copied to line 35 in the cache 501. The data tag 502 is used to store any additional data required to identify the memory location. In the example given above, the data tag 502 may be used to store the number 200, to indicate that original data was stored in an address from 200-299. In this way, data tag 502 can be used in conjunction with the particular line index 507 to map data stored in cache 501 to the operating system data stored in memory portion 400.

If an operating system write request is received from a particular server, control module 103 reviews the appropriate location of cache 501 to determine if the locked bit 504 is set. If the locked bit 504 is set, the control module 103 reviews server number data 505 to determine which server wrote the data stored at the memory segment. If a server other than the one making the current write request is stored at server number data 505, control module 103 in returns an error condition to the requesting server. If the locked bit 504 is not set, or if the server number stored at server number data 505 is the same as the server that made the current write request, the data is written to the appropriate location of cache 501, and the locked bit 504 is set to prevent future writes to that location by another server. Furthermore, the server number making the write request is stored at server number data 505.

It will be appreciated by those skilled in the art that other cache configurations may be used in accordance with the present invention, such as a set associative cache. For example, to reduce the number of error conditions due to operating system write requests, a two-way associative cache may preferably be used as the operating system cache. Under this configuration, two caches 501 are stored in memory portion 104. After receiving a write request from a particular server, the control module 103 reviews the locked bit 504 for the appropriate memory segment 507. If the locked bit 504 is set, the control module 103 examines the locked bit 504 for the appropriate memory segment 507 of the second cache. If the locked bit 504 in the second cache is not set, the data is written to the second cache.

It will be understood by those skilled in the art that still more cache configurations can be used in accordance with the invented system, including additional set-associative caches or fully associative caches. Use of a fully associative cache may be preferable in many circumstances. In such a fully associative cache, cache space is assigned for each server in the system that is to be booted. This ensures that each server will have the memory space necessary to perform any write operations to the operating system cache.

The embodiments of the invented system and method, as shown in the figures, have been presented for illustrative purposes only and are not intended to limit the scope of the invention. It will be appreciated by those skilled in the art that certain aspects of the invention may be changed, or steps re-ordered or omitted, without departing from the scope of the invention as a whole.

I claim:

1. A solid-state storage system for booting multiple servers comprising:
    an interface module adapted to communicate with a plurality of servers;
    a solid-state memory portion that may be accessed through use of the interface module, where the solid-state memory portion is segmented into a plurality of Logical Unit Numbers (LUNs);
    wherein a solid-state memory associated with a given one of the LUNs includes, within the given one of the LUNs:
    memory storing a single copy of operating system data for a given operating system, wherein the single copy of the operating system data may be accessed by both a first server and a second server through boot requests received through the interface module;
    a first memory area corresponding to a first cache accessible by the first server for use by the first server in operating system operations during a boot process for the first server and during operation of the first server after the boot process for the first server has completed; and a second memory area corresponding to a second cache accessible by the second server for use by the second server in operating system operations during a boot process for the second server and during operation of the second server after the boot process for the second server has completed;

wherein the interface module is adapted to communicate with external servers using Fibre Channel and each of the first server and the second server includes a Host Bus Adaptor (HBA) for communicating with the interface module.

2. The solid-state storage system of claim 1 wherein the interface module comprises a general integrated circuit device capable of processing requests from multiple applications using different request protocols.

3. The solid-state storage system of claim 1 wherein the single copy of the operating system data within the given one of the LUNs is an image of a LINUX operating system.

4. The solid-state storage system of claim 1 wherein the single copy of the operating system data may be further accessed by a third server through a boot request received through the interface module from the third server to boot the third server; and a third memory area corresponding to a third cache accessible by the third server for use by the third server in operating system operations during a boot process for the third server and during operation of the third server after the boot process for the third server has completed.

5. A solid-state storage system allowing operating system data stored in a single Logical Unit Number (LUN) to be accessed by a plurality of servers without creating unnecessary copies of the operating system data, the solid-state storage system comprising:

a solid-state memory configured to store both a cache located within a reserved segment of the solid-state memory and data associated with a given LUN; and a controller coupled to receive write requests to the cache from a server;

wherein a memory in the cache is divided into a plurality of lines, each line being reserved for storage of corresponding operating system data stored within the given LUN; and wherein each of the lines within the cache further includes a lock bit and contains a space to store data, wherein the data stored in the space of a given line indicates whether the corresponding operating system data stored within the given LUN has been copied from the given LUN to the space within the given line, wherein the controller is configured to allow a server to write to a line in the cache when the lock bit in the line is not set, and wherein each line in the cache further includes server number data and the controller is configured to allow a given server to write to the line in the cache when the lock bit is set if the server number data of the server requesting the write operation corresponds to the server number data stored in the line.

6. The solid-state storage system of claim 5 wherein the cache is a non-associative cache.

7. The solid-state storage system of claim 5 further including a plurality of servers coupled to the solid-state memory.

8. The solid-state storage system of claim 7 wherein the cache is a set-associative cache and wherein cache space is assigned within the cache for each server in the system that is to be booted to ensure that each of the servers has memory space within the cache necessary to perform write operations to the cache.

* * * * *